United States Patent [19]
Emer et al.

[11] Patent Number: 5,933,860
[45] Date of Patent: Aug. 3, 1999

[54] MULTIPROBE INSTRUCTION CACHE WITH INSTRUCTION-BASED PROBE HINT GENERATION AND TRAINING WHEREBY THE CACHE BANK OR WAY TO BE ACCESSED NEXT IS PREDICTED

[75] Inventors: Joel S. Emer, Acton, Mass.; Simon Steely, Hudson, N.H.; Edward J. McLellan, Holliston, Mass.

[73] Assignee: Digital Equipment Corporation, Maynard, Mass.

[21] Appl. No.: 08/902,487

[22] Filed: Jul. 29, 1997

Related U.S. Application Data

[63] Continuation of application No. 08/386,587, Feb. 10, 1995, abandoned.

[51] Int. Cl.[6] .............................. G06F 9/34; G06F 12/06
[52] U.S. Cl. ............................................ 711/213; 711/125
[58] Field of Search ................................ 711/128, 125, 711/137, 3, 213

[56] References Cited

U.S. PATENT DOCUMENTS

| | | | |
|---|---|---|---|
| 4,858,104 | 8/1989 | Matsuo et al. | 395/587 |
| 4,860,199 | 8/1989 | Langendorf | 711/213 |
| 4,894,772 | 1/1990 | Langendorf | 395/375 |
| 4,905,141 | 2/1990 | Brenza | 395/456 |
| 5,136,697 | 8/1992 | Johnson | 395/375 |
| 5,148,538 | 9/1992 | Celtruda et al. | 395/415 |
| 5,230,068 | 7/1993 | Van Dyke et al. | 395/375 |
| 5,235,697 | 8/1993 | Steely, Jr. et al. | 395/464 |
| 5,265,213 | 11/1993 | Weiser et al. | 395/587 |
| 5,327,547 | 7/1994 | Stiles et al. | 395/464 |
| 5,392,414 | 2/1995 | Yung | 395/455 |
| 5,418,922 | 5/1995 | Liu | 395/403 |
| 5,440,704 | 8/1995 | Itomitsu et al. | 395/375 |
| 5,530,958 | 6/1996 | Agarwal et al. | 395/403 |
| 5,619,676 | 4/1997 | Fukuda | 711/132 |
| 5,640,532 | 6/1997 | Thome | 711/128 |
| 5,659,699 | 8/1997 | Berternitz | 711/216 |
| 5,687,349 | 11/1997 | McGarity | 711/137 |

OTHER PUBLICATIONS

Liu, Lishing, "Partial Address Directory for Cache Access", IEEE Transactions on Very Large Scale Integration (VLSI) Systems, V.2, No.2, pp. 226–240, Jun. 1994.

Theobald et al., "A Design Framework for Hybrid–Access Caches", High Performance Computer Architecture, 1995 Symposium, pp. 144–153, Feb. 1995.

Seznec, Andre, "About set and skewed associativity on second–level caches", Computer Design—ICCD '93, 1993 International Conference, pp. 40–43, 1993.

*Primary Examiner*—Tod R. Swann
*Assistant Examiner*—Christopher S. Chow
*Attorney, Agent, or Firm*—Christopher J. Cianciolo

[57] ABSTRACT

A computer system including an instruction cache (I-cache) having a plurality of banks for storing a subset of data from memory is shown to include a prediction mechanism for predicting which bank of the I-cache contains the required data. A prediction value, including a sequential prediction hint and a branch prediction hint, is associated with each instruction stored in the I-cache. The prediction value may either be stored with the I-cache data, or in a separate memory included before the I-cache. If the predicted value is incorrect, the predicted hint is 'trained' to provide a higher degree of accuracy for repetitive instruction stream operation. Processor performance is additionally improved by providing a branch hint that allows for smoother transition between changing instruction streams.

21 Claims, 6 Drawing Sheets

MULTIPROBE INSTRUCTION CACHE WITH INSTRUCTION-BASED PROBE HINT GENERATION AND TRAINING WHEREBY THE CACHE BANK OR WAY TO BE ACCESSED NEXT IS PREDICTED

This application is a continuation of application Ser. No. 08/386,587, filed Feb. 10, 1995 now abandoned.

FIELD OF THE INVENTION

This invention relates generally to computer systems and more specifically to the management of cache memory in a computer system.

BACKGROUND OF THE INVENTION

As it is known in the art, computer processing systems include a central processing unit which operates on data stored in a memory. Increased computer processing performance is often achieved by including a smaller, faster memory, called a cache, between the central processing unit and the memory for temporary storage of the memory data. The cache reduces the delay associated with memory access by storing subsets of the memory data that can be quickly read and modified by the central processing unit.

Because computer processes commonly reference memory data in contiguous address space, data is generally obtained from memory in blocks. There are a variety of methods used to map blocks of data from memory into the cache. Two typical cache arrangements include direct mapped caches and set associative caches.

In a conventional direct mapped cache, a block of data from memory is mapped into the cache using the lower bits of the memory address. The lower bits of the memory address are generally called the cache index. The upper bits of the memory address of the data block are generally called the 'tag' of the block. A tag store, having a number of locations equivalent to the number of blocks in the cache, is used to store the tag of each block of data in the cache.

When a processor requires data from the cache it addresses the cache and the tag store and compares the received tag to the upper bits of the memory address of the required data. If the data is not in the cache, the tag does not match the upper address bits and there is a 'miss' in the cache. When there is a 'miss', a memory read is performed to fill the cache with the required data. It is desirable to minimize the number of cache misses in order to avoid the latency incurred by the resulting memory reference.

Direct mapped caches are advantageous because they provide a cache system with minimal address complexity. Because the addressing scheme is straightforward, the cache is able to quickly return data to the central processing unit. However, one drawback of direct mapped caches is that since there is only one possible location in the cache for data having a common cache index, data may be constantly swapped in and out as memory data having a common cache index is needed by the processor. Such a situation is referred to as 'thrashing' and results in a high miss rate and reduced system performance.

Set associative caches serve to reduce the amount of misses by providing multiple cache locations for memory data having a common cache index. In set-associative caching, the cache is subdivided into a plurality of 'sets'. Each set has an associated tag store for storing the tags of the blocks of data stored in the set. As in direct mapped caching, the location of a particular item within the cache is identified by a cache index usually derived from the lower bits of the memory address.

When the processor wants to fetch data from the cache, the cache index is used to address each of the sets and their associated tag stores. Each set outputs a data item located at the cache index and the data items are generally input to a large multiplexer. The associated tags are each compared against the upper bits of the main memory address to determine if any data item provided by the sets is the required data item. Assuming that the data item to be fetched is in one of the sets of cache, the tag that is output by the tag store associated with the set matches the upper bits of the memory address. Depending on which tag matched, the appropriate select is provided to the multiplexer and the required data is returned to the processor.

Set-associative cache mapping thus provides improved performance over a direct mapped cache by reducing the frequency of cache misses. However, the amount of time required to perform the set comparison makes the set-associative cache memory system have a longer latency compared to the direct mapped cache system.

Multi-probe caches incorporate the advantages of both set associative cache design and direct mapped cache design. Multi-probe caches reduce the probability of thrashing in a cache by providing multiple locations in the cache where data may be stored. A multi-probe cache uses a direct mapped structure that is accessed sequentially with different addresses until the data is located, where each address in the sequence is generated by applying a hashing function to the previous address of the sequence.

The read of a multi-probe cache operates as follows. First the cache is accessed using the cache address of the required data. If the data is not at that cache location, then a hashing function is applied to the cache address, and a second, hashed address is provided. The cache is then accessed using the hashed address. If the data is present in the location of the hashed address, a hit occurs and the data is transmitted to the processor. Only if the second access is also unsuccessful does data need to be retrieved from memory. If there is a match between the read address and the tag at the hashed cache location, the data from the hashed cache location is swapped with the data at the first cache location to provide faster access to the most recently used data on the next lookup.

Thus the multi-probe caches emulate the retention capabilities of set-associative caches, with access time similar to those of a direct mapped cache. However, one drawback of the multi-probe cache is that a second cache lookup at a rehash address is attempted after every miss at the first cache address. Where there is a miss at both the first and second cache addresses, the hash-rehash technique replaces potentially useful data at the hashed location. As a result, secondary thrashing occurs due to an increase in the number of memory lookups required to restore data which is overwritten by rehashed data. Secondary thrashing may consequently reduce the performance of hash-rehash caches to below that of direct mapped caches.

One method of reducing the probability of secondary thrashing is described in U.S. patent application "Method and Apparatus for Serialized Set-Prediction", Ser. No. 08/668,316, filed Jun. 26, 1996 (pending) by Macri, et al. (hereinafter referred to as the Macri patent). In Macri, a direct-mapped cache memory was partitioned into a number of banks with each of the banks being addressable by a bank index, where the bank index was a portion of the memory address for the corresponding cache location. A prediction memory, having preferably a larger number of storage locations relative to the number of cache locations, was addressed prior to the cache lookup. Stored in each location of the prediction memory is some portion of the upper address bits of the memory address of the corresponding cache location. When addressed, the prediction memory provided a predicted bank index, which was appended to the incoming cache address to predict the correct bank in which the data was located.

Thus the Macri design provided a cache with direct-mapped cache access capabilities was provided that additionally allowed for storage of more than one item memory data having a common cache index. In addition, the use of the prediction store increased probability of locating the correct cache data on the first access.

One drawback of the above mechanism is that a tradeoff had to be made between the accuracy of the prediction and the size of the prediction store. A large prediction store would operate effectively as an advanced tag lookup, and although it would provide the exact cache location or a miss notification on first access, the delay associated with accessing an entire tag makes the design unfeasible. In addition, because the predication was based solely on the memory address of the stored data, certain attributes of the stored data were ignored, resulting in a higher miss rate than necessary for that data type.

It would be desirable to provide an improved prediction mechanism which would have increased accuracy with minimal increase to hardware and propagation delay.

SUMMARY OF THE INVENTION

According to one aspect of the invention, a method of addressing a cache memory having a plurality of banks of memory locations includes the steps of determining, responsive to retrieved instruction data, a number of potential next addresses of required data stored in the cache memory and storing, at a location associated with the retrieved instruction data, a prediction value. The prediction value indicates which one of the banks of the cache memory stores the required data, and is determined responsive to a type of the retrieved instruction data. The method further includes the step of selecting, responsive to said prediction value, one of said potential next addresses for addressing said cache memory.

According to another aspect of the invention, a computer system according to the invention is shown to include a first memory for storing data, and a second memory, relatively smaller and faster than the first memory, for storing a subset of the data from the first memory, where the second memory is apportioned into a plurality of banks, and each of said banks has a plurality of locations for storing data. The computing system also includes a third memory having a plurality of locations, each of the locations associated with one of the locations of the second memory, where each of the locations of the third memory stores a prediction value. The computing system further includes means, responsive to the data stored in one of the locations of the second memory, for determining the associated prediction value.

With such an arrangement, a prediction value is associated with each instruction stored in cache memory, and may be used to provide fast and accurate bank prediction during operation. By incorporating accurate bank prediction, the system incorporates the performance advantages of direct mapped cache addressing with the low miss rates associated with set-associative cache designs. The accuracy of the bank prediction is further enhanced because the inherent nature of the stored data is taken into account when formulating the associated bank prediction value.

BRIEF DESCRIPTION OF THE DRAWINGS

The above-mentioned and other features of the invention will now become more apparent by reference to the following description taken in connection with the accompanying drawings in which.

DESCRIPTION OF THE PREFERRED EMBODIMENT

Figure 1:
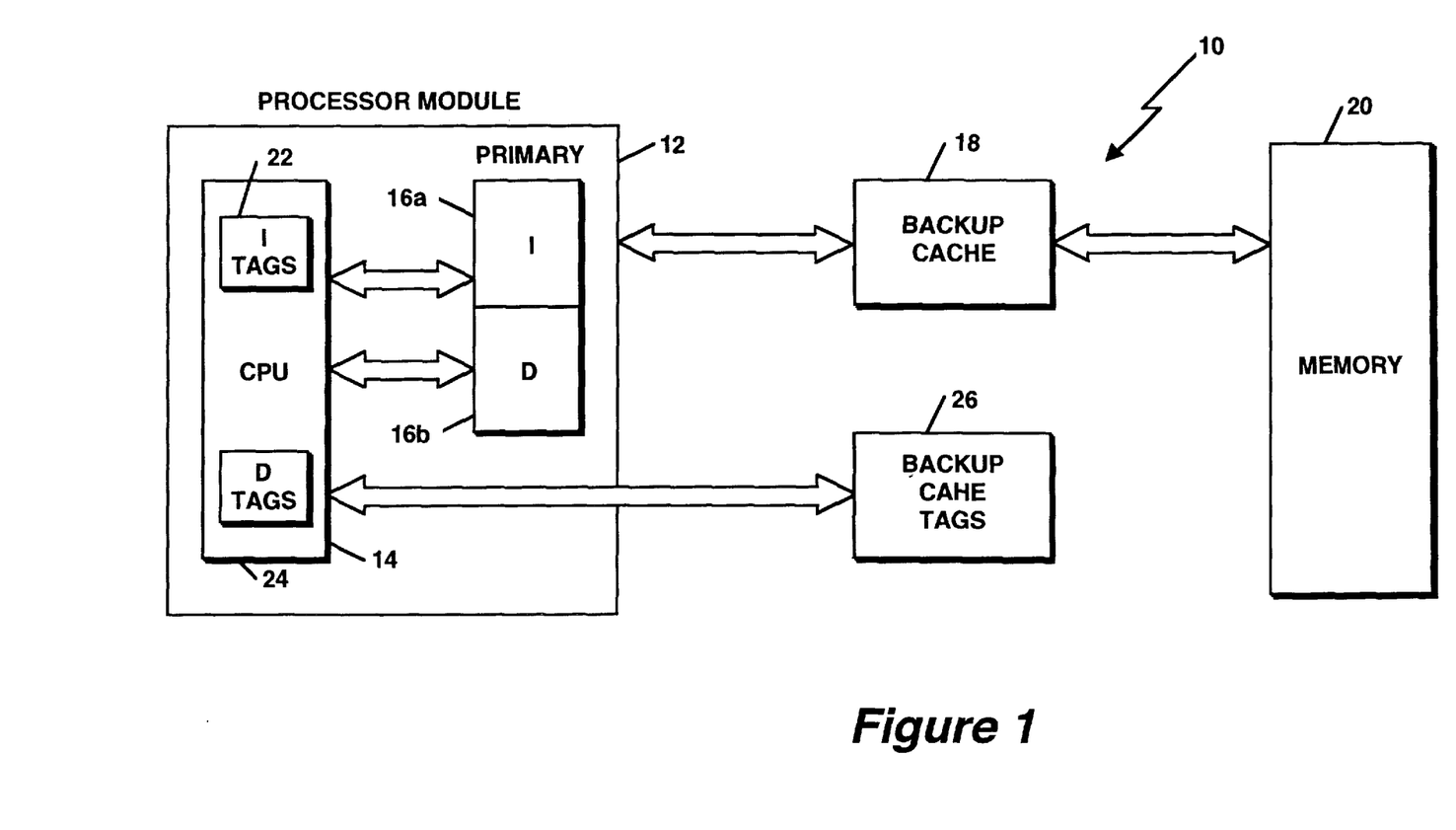
FIG. 1 illustrates a computer system in accordance with the present invention including a cache sub-system having prediction logic.

Referring now to FIG. 1, a computer system 10 is shown to include a processor unit 12 including a central processing unit (CPU) 14 for processing an instruction stream. The CPU 14 includes a small, fast memory, referred to as a primary cache, 16, that is used for temporary storage of data.

The primary cache 16 is coupled to a backup cache 18. The primary cache 16 generally stores a subset of data from the backup cache 18. The backup cache 18, is coupled to a memory 20, and in turn stores a subset of the data stored in the memory 20.

The primary cache 16 is shown divided into two portions: an instruction cache (I-cache) 16a and a data cache (D-cache) 16b. The I-cache 16a is used for storing instruction stream data for use by the CPU 14.

Because the primary cache 16 stores only a subset of the data stored in backup-cache 18 and memory 20, the entire memory address is not needed to access each primary cache location. By way of example, if memory comprised 16M byte of data, and data was retrieved in 16 byte (64 bit) blocks, the memory address would comprise address bits <19:0>. If the primary cache is only capable of storing 16K byte of data, only address bits <9:0> of the memory address are required to index the primary cache. In order to keep accurate track of which memory locations are stored in the primary cache, the remaining memory bits <19:10> must be stored along with the retrieved memory data.

Therefore, associated with the I-cache 16a and D-cache 16b are separate tag stores, I-cache tag store 22 and D-cache tag store 24. Each of the tag stores 22 and 24 have a number of entries corresponding to the number of blocks of data stored in the corresponding section of the primary cache. Each entry of the tag store stores the upper bits of the memory address of the corresponding entry in the primary cache.

During typical cache operation, the primary cache is accessed by the low order bits of the memory address (hereinafter referred to as the cache index) and the upper bits of the memory address are compared against the tag data retrieved from the corresponding location in the related tag store. If there is a match between the upper memory address bits and the data retrieved from the related tag store, there is a 'hit'; i.e., the desired data is located in the primary cache. If there is not a match, then there is a 'miss'; i.e., the desired data is not located in the primary cache, and must be obtained from either the backup cache 18 or the memory 20.

Misses in the primary caches are undesirable because of the latency inherent in obtaining data from memory 20, which is relatively slow in speed as compared to the speed of the CPU 14. Generally in a miss situation, the CPU 14 is 'stalled', that is it stops processing any instruction until it obtains the required data from memory. Frequent stalls may considerably reduce the performance of the CPU, and thus the computer system 10 as a whole.

Figure 2A:
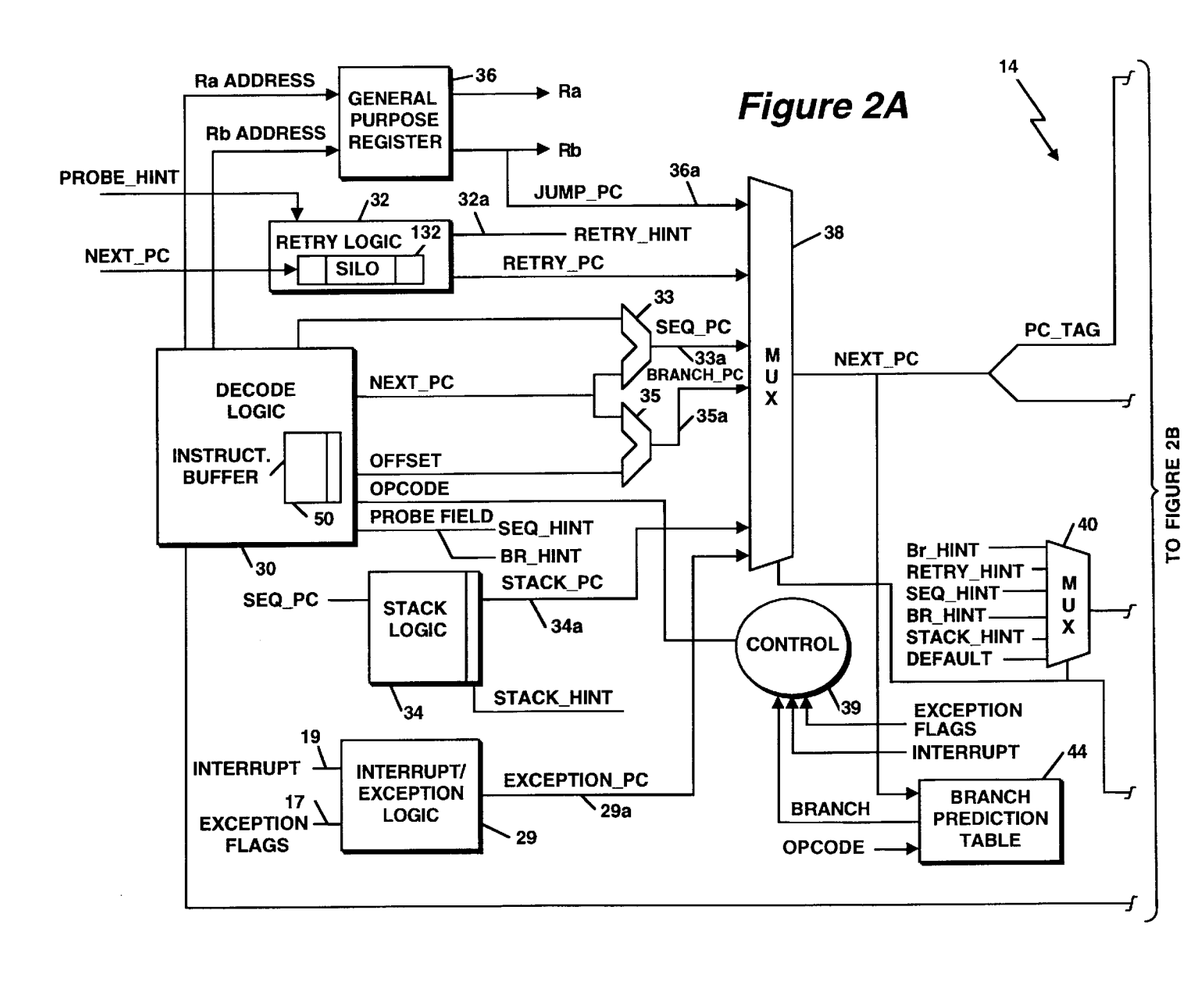
FIGS. 2A and 2B illustrates one embodiment of the prediction logic incorporated in the central processor unit of FIG. 1.
Figure 2B:
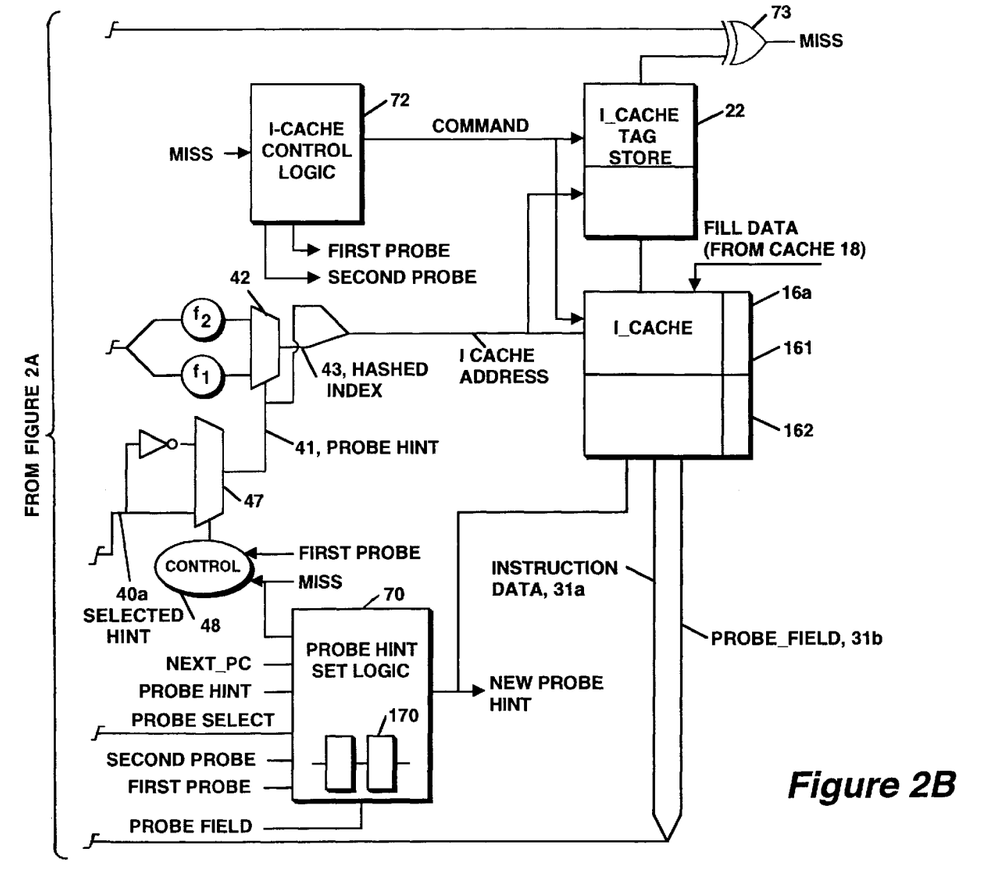

Referring now to FIGS. 2A and 2B, the I-cache design of the present invention serves to increase processor performance by reducing the rate of I-cache misses as will be described. FIGS. 2A and 2B are block diagrams of components that are advantageously located in the CPU device 14. It should be noted, however, that depending on the size of the design, and the types of devices used in the design, the lines of demarcation between what logic is located in the CPU device 14 and what logic is not could easily be altered without changing the spirit of the invention.

CPU 14 is shown to include decode logic 30, coupled to receive instruction data on line 31a and probe field data on line 31b from the I-cache 16a. The I-cache 16a is here apportioned into two banks, 161 and 162 respectively. Decode logic 30 includes an instruction buffer 50, for temporary storage of the instruction data and probe field data for processing by the decode logic. The instruction buffer 50 stores a number of instructions which are to be processed in a given instruction stream. By providing an instruction buffer, the decode logic need not access the I-cache before each instruction, and processing performance is improved.

In order to facilitate discussion of the components of FIGS. 2A and 2B, the general format of instructions decoded by decoder 30 will be described.

In the present embodiment, each instruction stored in I-cache 16a and instruction buffer 50 comprises 32 bits of instruction data and a probe field. The probe field is used in addressing the I-cache as will be described later. The 32 bits of instruction data may be processed differently depending upon the function of the instruction. The function of the instruction is defined in an opcode field.

In the present embodiment, there are four basic types of instruction formats; PALcode instructions, branch instructions, memory instructions, and operate instructions. The typical format of each instruction is shown below in Table I.

TABLE I

PALcode format Instruction

| 31 | 26 25 | 21 20 | 16 15 | 5 4 | 0 |
|---|---|---|---|---|---|
| Opcode | | NUMBER | | | |

Branch Format Instruction

| 31 | 26 25 | 21 20 | 16 15 | 5 4 | 0 |
|---|---|---|---|---|---|
| Opcode | Ra | | Displacement | | |

TABLE I-continued

Memory/Jump Format Instruction

| 31 | 26 25 | 21 20 | 16 15 | 5 4 | 0 |
|---|---|---|---|---|---|
| Opcode | Ra | Rb | Displacement | | |

Operate Format Instruction

| 31 | 26 25 | 21 20 | 16 15 | 5 4 | 0 |
|---|---|---|---|---|---|
| Opcode | Ra | Rb | Function | | Rc |

PALcode instructions specify an opcode that uses the data in the remaining 26 bits as input to Programmable Array Logic for purposes which need not be described here.

The Branch instruction is used to change the flow of the instruction stream. For example, contents of the displacement field may be added to the I-cache memory address (typically referred to as a program counter (PC)) to calculate the next I-cache address, or 'next PC'. Alternatively, the opcode field of the branch instruction may call for a branch to the address stored in a register indicated by the address stored in the Ra field. The branch instruction is also used to return from subroutines.

The memory instruction uses some combination of data in registers indicated by the Ra field, the Rb field, and/or the displacement field to calculate a memory address for a subsequent operation.

The function instruction generally combines the data in the register Ra with that of Rb by means of some arithmetic formula, and stores the result in register Rc.

Referring again to FIGS. 2A and 2B, decode logic 30 is coupled to provide an Ra address and an Rb address to a register file 36. The register file 36 is used for temporary storage of information for use during instruction operation. The register file 36 comprises 32 registers, each having 64 bits of data. For jump operations, indicated during memory/jump format instructions, the contents of register Rb are fed as a Jump_PC on line 36a to a mux 38.

The decode logic is also coupled to provide offset data (from the displacement field of the branch format instruction) to adder 35. Adder 35 combines the offset value with the next_PC value to provide a branch PC, (BR_PC on line 35a). The branch PC is used during branch operations to change the flow of the instruction stream.

The decode logic 30 also provides a PC increment (PC_INC) as input to an adder 33. The value of the PC increment is dependent upon the number of instructions that may be retrieved from the I-cache 16a during a read operation, and basically is used to step from one instruction group to the next sequential instruction group. Accordingly, the PC increment is added via adder 33 to form the next sequential PC (SEQ_PC) on line 33a as input to mux 38.

Decode logic 30 provides opcode data to a branch prediction table 44. As mentioned above, branch instructions may change the sequence of instructions performed by the CPU. However, because the instruction buffer 50 stores a number of sequential instructions, if the branch instruction actually changes the instruction flow, then the instructions stored in instruction buffer 50 will not execute, and are discarded. For this purpose, the branch prediction table 44 is used to predict whether or not the instruction is going to branch. If the branch is going to occur, the branch prediction table will start an access of the I-cache with the branch PC. By starting early access into the I-cache, the instruction buffer may be filled with the branch destination instruction stream, and any stalls of the CPU are minimized.

The decode logic 30 additionally provides control input to a subroutine stack 34. The subroutine stack 34 is used to store addresses which are to be returned to upon the completion of a subroutine. During operation, a 'CALL' to a subroutine will cause the SEQ_PC to be pushed onto the stack 34. When the subroutine is completed, a 'RETURN' instruction will cause the stack 34 to provide a stack PC (the stored Ra field) to a mux 38.

The subroutine stack 34 additionally stores a stack hint with each of the stored addresses. The stack hint is used to address the I-cache as will be described later. Suffice it to say that when a stack PC is provided to mux 38, the stack hint, stored with the stack PC is provided to mux 40.

Retry logic 32 additionally provides a Retry_PC to mux 38. During operation of the computer system, an exception may occur that requires previously executed instructions to be 'retried'. The retry logic 32 includes a silo 132, for storing previously issued PC's. When an instruction is retried, the previously issued PC's are fed out of the silo 132, and used to form the next_PC for accessing I-cache 16a. Stored with each next_PC is a retry_hint. During replay of the silo 132, the retry_hint is provided on line 32a to mux 40. The retry_hint is used in addressing the I-cache 16a, and will be described in greater detail later in the specification.

Interrupt/Exception logic 29 receives an interrupt signal on line 19 and exception flags on line 17. The interrupt signal is asserted when various devices or processes need access to the CPU and/or memory data. The exception flags are a group of signals used to indicate various processing errors in the computer system. In response to the assertion of these signals interrupt/exception logic 29 provides an exception_PC on line 29a. The exception_PC will vary depending upon the value of the exception flags and interrupt state of the machine, and is used to index the appropriate instruction stream to handle the interrupt or error condition.

Thus, mux 38 receives either the branch PC from adder 35, the next sequential PC from adder 33, a jump PC from register file 36, a stack PC from subroutine stack 34, a retry PC from retry logic 32, or an exception_PC from interrupt/exception logic 29. Depending on the opcode of the instruction, the branch indication from the branch prediction table, or any faults or exceptions that may have occurred, the appropriate PC is selected as the next PC for accessing the I-cache 16a.

Because all of the next_PC bits are not required to access the I-cache, the upper portion of the address bits are used to form a PC TAG. The remaining portion of the next-PC from mux 38 is then altered using two different hashing functions, f1 and f2, to provide two distinct addresses to the I-cache 16a given the same next-PC input value. The f1 hashed index and the f2 hashed index are fed to mux 42. The select from mux 42 is driven by a probe hint signal on line 41. The probe hint signal 41 is used to select between which hash function to use first when accessing the I-cache 16a. The output from mux 42 is provided as the hashed index on line 43.

As mentioned previously, the I-cache is apportioned into two discrete banks of memory, each bank having an equal number of I-cache locations. The hashed index on line 43 is merged with the probe hint signal on line 41 to form an I-cache address. Each bank of the I-cache is accessed using the same number of address bits, and thus in essence the probe hint signal is used to select between the two I-cache banks for reading the data.

It should be noted that the I-cache addressing scheme of FIGS. 2A and 2B may be altered such that the hashing functions f2 and f1 each provide a unique set of addresses for a given set of input addresses. With such an arrangement, the probe hint value need not be appended to the hashed index, and the I-cache address would be directly coupled to the output of mux 42.

The probe hint signal is derived as follows. In the embodiment of FIG. 2, each I-cache location includes an instruction field for storing instructions such as those described in Table I, and a probe field. The probe field includes a sequential probe hint and a branch probe hint field.

During operation, the instruction data and the probe field data are both retrieved from an I-cache location, and stored in the instruction buffer 50. During operation, the instruction propagates to the top of the instruction buffer. The decode logic processes the instruction field, while the probe field is forwarded to mux 40. In addition, as mentioned previously, a stack hint is received at mux 40 from stack logic 34. A retry hint is received at mux 40 from retry logic 32. A jump hint derived from the branch hint field as will be described below.

Depending on the opcode of the instruction, the address of the next instruction in a series of instructions could be sequential, could branch away from the current series of instructions either by adding a displacement or by performing an absolute jump to a new address, or could be a subroutine return. Independent of the opcode of the instruction the address could be generated from the retry logic 32, or interrupt/exception logic 29. Control logic 39 drives the select of mux 38 to choose the appropriate next-PC.

The select value provided from control logic 39 to drive mux 38 is provided as the select value for mux 40, and a selected hint field is provided on line 40a. The selected hint field, and the inverse of the selected hint field, are forwarded to mux 47. The select of the mux 47 is controlled by probe control logic 48 as will be described below. The output from mux 47 is the probe hint signal on line 41. The probe hint signal drives the select of mux 42 to select a hashed index. The probe hint on line 41 is also appended to the hashed index to form the I-cache address. The I-cache address is then used to access the I-cache 16a as well as the I-cache tag store 22.

Figure 3:
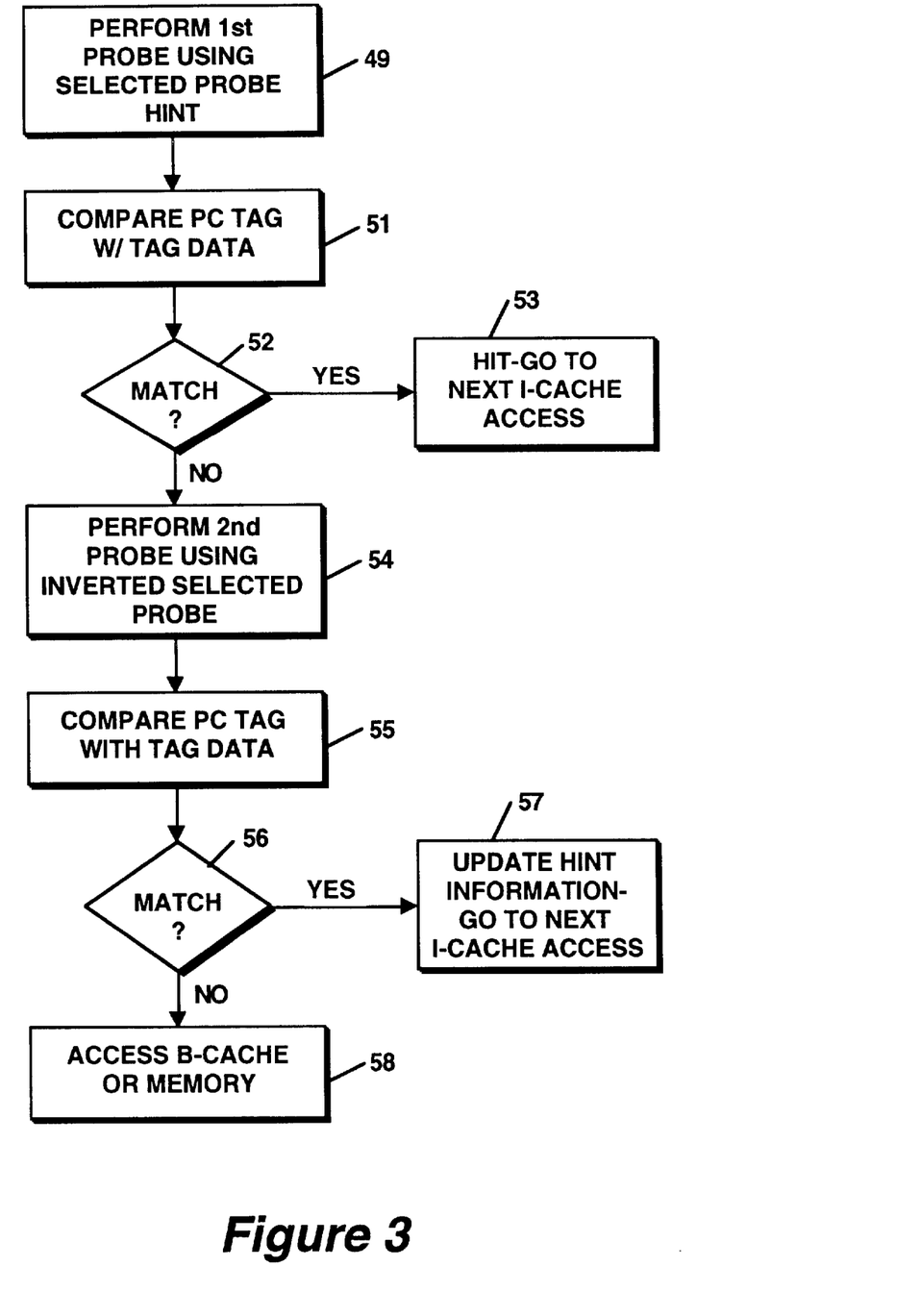
FIG. 3 is a flow diagram illustrating the function of the prediction logic of FIG. 2.

Referring now to FIG. 3, a flow diagram illustrating an example I-cache access will be described with reference to the hardware elements of FIG. 2. When data is initially stored in I-cache 16a, the upper memory bits used to access the retrieved data are stored in I-cache tag store 22. When, at step 49, the I-cache is accessed, a simultaneous probe of the same location in the I-cache tag store is performed to ensure that the data that is retrieved from the I-cache is the desired memory data.

During the first probe, the selected probe hint, output from mux 40, is selected to be the probe hint for selecting the hashed index from mux 42, and is also appended to the hashed index to form the I-cache address. For purposes of example, assume that during the first probe, the selected probe index has a value of 0. Consequently, the hashed index will be calculated using the f1 hashing function, and the value of '0' will provide the most significant bit of the I-cache address.

This I-cache address is used as an address to access both the I-cache 16a and the I-cache tag store 22. At step 51 a comparison is made between the PC TAG and the contents of the I-cache tag store at the location pointed to by the I-cache address. If it is determined at step 52 that there is a match, then there is a 'hit', and at step 53 the required data has been located in the cache, and the I-cache may begin processing the next I-cache address. However, if at step 52 it is determined that the PC tag and the contents of the tag store do not match, there is a 'miss'. A 'miss' resulting from the first probe does not necessarily indicate that the required data is not in the I-cache. Rather, the required data could be located in the second, unprobed bank of the I-cache.

In response to a 'miss' on the first probe, at step 54 the control logic 48 selects the inverted selected probe index from mux 47, to provide the probe hint. In keeping with the above example, where the selected probe index was '0', the inverted selected probe index is thus equal to '1'. This probe hint is used to select the result of the next-PC hashed using the f2 function as the hashed index. In addition, a '1' is appended to the hashed index to form the I-cache address.

This I-cache address is then used to access the I-cache 16*a* and the I-cache tag store 22. At step 55 the PC TAG field, which is unchanged since the first probe, is compared against the output from the I-cache tag store 22. If at step 56 it is determined that there is match, then at step 57 the probe hint stored with that instruction is updated either at the branch or sequential hint bit depending on the source of the PC that missed. It is updated with the second probe hint value, and the I-cache is ready to accept another I-cache access request.

If, however, at step 56 it is determined that there is no match between the PC TAG and the contents of the I-cache tag store, then the data is not located in the I-cache, there is a 'miss', and at step 58 the required data must be retrieved from memory 20.

The performance of the above method could be improved by an earlier determination that a bcache (or memory) access is required by accessing both tag store locations during the first I-cache access. In such an arrangement, the f1 and f2 hashed addresses would be fed directly as addresses to each tag store bank, and the probe of each bank would be done simultaneously. As a result, the indication of a 'miss' in the I-cache could be determined earlier, and the inevitable memory access could be started.

However, if the probe fails on the first try, and the data is located in the I-cache, then a second I-cache access is required to retrieve the data. The instruction buffer may become empty during the I-cache probes, and as a result the decoder may be stalled awaiting I-cache data. Accordingly, there is a direct performance advantage associated with increasing the accuracy of the first probe in order to minimize the number of decoder stalls.

The present invention provides a mechanism for predicting the bank in which required I-cache data is stored by storing, with each instruction or group of instructions, a probe hint field. By taking advantage of the nature of the stored data; i.e., sequential instruction data, and by storing the probe hint with the data, the accuracy of the probe prediction, and accordingly system performance, is improved.

In addition, because the instruction stream does not always flow sequentially, a separate probe hint field is included for instances in which the instruction branches, returns from a subroutine, jumps, or is retried. By storing separate probes with each different type of instruction flow, the accuracy of the first prediction is further enhanced.

The probe hints are generated by probe hint logic 70 according to the following principles. For ease of understanding, the probe hint field will be described as though there is a probe hint field associated with each instruction. However, it should be understood that if instruction data is stored as blocks of instructions, and retrieved from the I-cache in block size units, there need be only one sequential probe hint field associated with each block of instruction data, where the probe hint field is only used for the last instruction in the block.

Each instruction, as it is read in from bcache 18 (or memory 20) is assigned a probe field having a sequential probe field and a branch probe field. The hint used for the interrupt/exception routines are assigned a default value. Each of the other hint fields described above, i.e. the jump hint, the stack hint, and the retry hint, are set from either the value in the sequential hint field, or the value in the branch hint field as follows.

The value of the sequential hint field can be determined in one of two ways. When the refill data is provided from the bcache 18 (or memory 20) it is stored in one of the banks. The method used to select the bank to be allocated is described below. The sequential probe hint field could be assigned the value of the bank in which the instruction is stored. However, it should be noted that the sequential probe hint does not indicate where its own instruction is stored, it indicates in which bank the next instruction in the sequence is stored. As such, in order to provide an accurate probe hint, it would be desirable to 'peek' ahead at the next sequential instruction to determine the appropriate sequential hint bit.

The value of the branch hint may also be determined in a similar manner. By providing a mechanism that would allow you to determine in which I-cache bank a destination of a branch instruction is stored, the branch hint value of the predict field could be determined and stored along with the returned refill instruction. Such a mechanism would require the ability to determine the potential destination addresses of a branch instruction. Typically, the branch prediction table 44 (FIGS. 2A and 2B) is capable of providing such information.

The idea of 'peeking ahead', as described above, refers to the hint bits associated with the refill instruction. As one instruction is fetched, the location of the next instruction in the sequence (whether it be a sequential or the target of a branch) provides the value for the corresponding hint associated with the refill instruction. Accordingly, as data is stored in the I-cache, it must look backward, to update the previous instructions hint bit.

Figure 4:
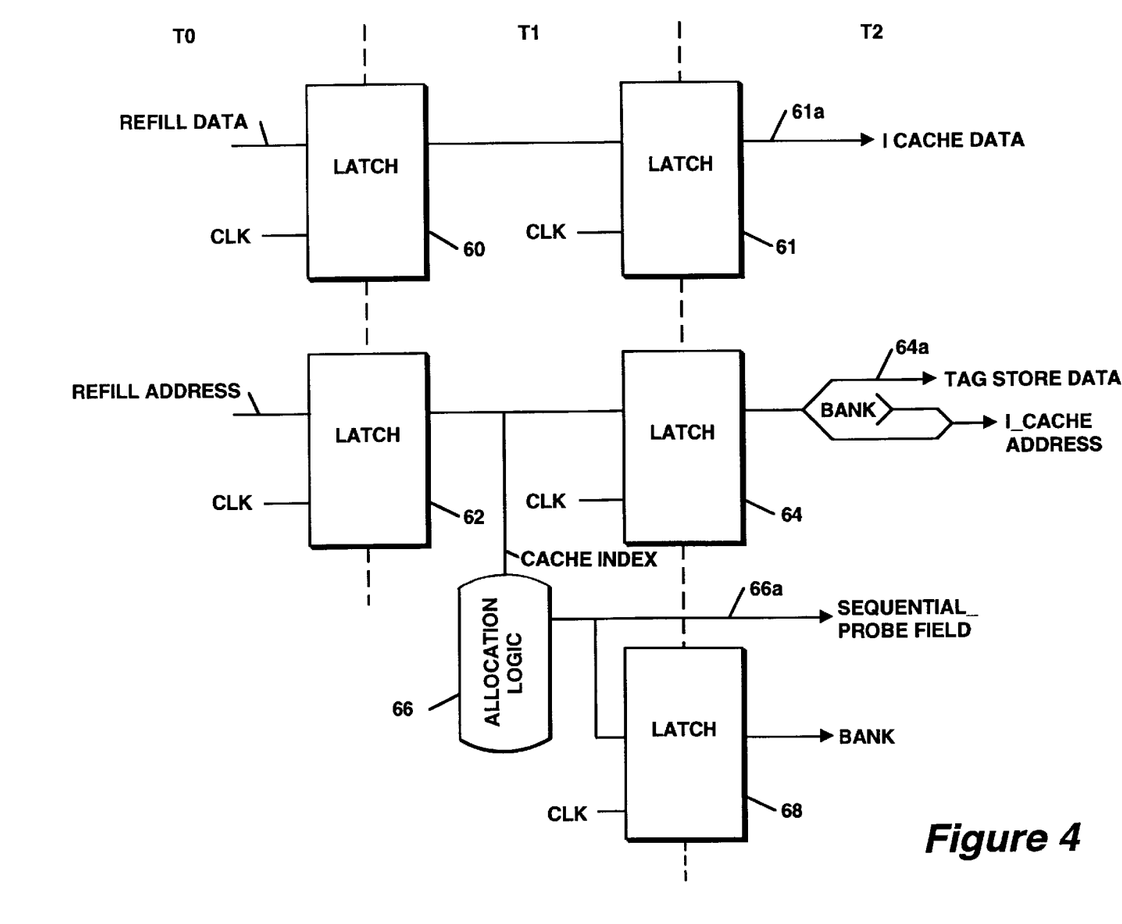
FIG. 4 is a block diagram illustrating one potential logic device for providing a prediction value for use in the prediction logic of FIG. 2.

One method for updating the value of the sequential hit field of the instruction prior to a miss is shown in FIG. 4. A two stage silo is shown, where each of the latches in the silo are clocked by a common clock signal CLK. Data is fed through the silo in a pipelined fashion, such that different address and data fields are being processed during each discrete computer cycle (where here each cycle is labelled T0, T1, and T2). For purposes of explanation, the sequential flow of two instructions through the three cycle write silo is described below.

During cycle T0, refill data and refill address for instruction 1 are received from the bcache 18. At the end of T0, the refill address and data for instruction 1 are stored in latch 62 and latch 60, respectively. During cycle Ti, allocation logic 66 receives a cache index portion of the refill address of instruction 1. Based on the cache index and other pertinent data, the allocation logic determines in which bank the refill data should be stored.

The allocation logic may use any variety of methods for selecting in between banks. For example, allocation logic may keep a table of addresses with information about when each of the I-cache addresses was last accessed, though the use of a time-stamp or some other, similar mechanism. When the allocation logic receives a cache index, it compares the time stamps of the two banks, and selects the least recently accessed bank as the bank for storing the new data. Thus, by determining which I-cache locations are seldom accessed, the allocation logic attempts to ensure that frequently used data is not overwritten. Other details of how the allocation logic makes a selection are not pertinent to this invention. Suffice it to say that the best bank, in terms of reducing the rate of I-cache misses, is selected.

At the end of cycle T1, when allocation logic 66 determines the bank in which to store instruction 1 data, the determined bank is forwarded as the sequential probe field for the instruction that is being processed in cycle T2. In addition, at the end of cycle T1, the determined bank value is stored in latch 68.

When instruction 1 data propagates to cycle T2, instruction 2 data propagates to cycle T1. In cycle T1, a bank value is determined by allocation logic 66 for instruction 2. This bank value is forwarded as the sequential probe value on line 66a, and is written to the I-cache along with the instruction 1 data, at the instruction 1 address. As a result, the instruction 1 data now stores the known, selected bank of instruction 2, and therefore during sequential instruction stream operation it is assured that the predicted bank most likely be accurate.

The allocation method described with reference to FIG. 4 is particularly useful for allocating sequential blocks. For instances where refill data does not comprise sequential instructions, other methods of allocation, such as a modular Least Recently Used (LRU) allocation may be used. Modular LRU allocation operates using a modular counter as follows. A modular counter is provided along with a free-running wraparound counter. Each time the free-running counter hits a predetermined limit, the modular counter is incremented. Each time a cache block is accessed, whether for a read or a write operation, the current modular counter value is stored along with the data. When a block of data needs to be allocated, the current value of the modular counter may be compared against the stored modular count of each cache block to determine which block has the most 'stale' data. This block is chosen for allocation.

Suffice it to say, however, that for instructions that are guaranteed to flow sequentially, the look-ahead mechanism of FIG. 4 may be used to provide the sequential hint value, while the branch hint value is unchanged.

However, for each branch instruction there are two possible paths; either the branch is not taken, and the instructions therefore flow sequentially, or the branch is taken, and the instruction stream direction is changed. Thus, both the sequential hint field and the branch hint field, for branch and jump instructions, include important hint data. The sequential hint value may be determined just as it is for any sequential operation, as described with reference to FIG. 4. The branch hint, however, may either be assigned the appropriate value during allocation by predicting in which bank the destination of the branch in located, or may be defined a default value at initiation. If it is defined a default value, it is therefore unpredictable at initiation, and accordingly must be 'trained' when the branch is actually taken during the course of instruction flow. The mechanism used for training hints will be discussed later herein.

The stack hint value is generated directly from the sequential hint field as follows. During a subroutine CALL instruction, a RETURN address is pushed onto stack 34. Along with the RETURN address, the value of the sequential probe field is pushed onto the stack. When the subroutine has completed, the pushed sequential hint becomes the stack hint.

The decision to use the sequential hint as the stack hint takes advantage of the fundamental principles behind subroutine operation. Subroutines are an interruption in the normal flow of programming operation. When the subroutine has completed, the process resumes its normal, sequential flow, and thus in all likelihood the required I-cache data for the return instruction is located in the same I-cache bank predicted by the sequential probe hint. Accordingly, by providing the sequential probe hint as the hint value for the stack, it can be assured that the correct bank will in all likelihood be selected on the first probe of the I-cache.

During a jump instruction, the branch hint field is used to provide the predicted jump hint. Again, the reasoning behind such an assignment is due to the nature of a jump instruction; in all likelihood, the jump instruction is interrupting the normal, sequential flow of instructions. As such, the branch hint is the best choice to use for predicting the appropriate bank of I-cache data to access. Accordingly, at initiation, the jump hint is unpredictable, and its value may be randomly selected. During operation, however, the jump hint will get 'trained' to select the proper I-cache bank.

When there is a retry, the probe hint used for the original, successful, I-cache access is input into the retry silo 132. As a result, as the instructions are replayed, the correct bank is selected for each I-cache access.

Although this discussion focusses on jump, branch, sequential, retry, and stack pc's and hints, it is noted that there are other types of instructions that may also be used, and thus would have appropriate hint values assigned to them during operation. Possible values are, of course either the sequential or branch hint values, or some other default value.

An analysis of how the instruction affects instruction stream flow is the determinative decision in how a hint is selected. For example, sequential hints can be used when the instruction is likely to be executed in sequence with the previous and subsequent instructions in the I-cache bank. Branch hints can be used when there is an interruption in flow, and particularly where this interruption in flow develops into a known pattern, or loop, that would allow for optimal training of the hints. For instructions, however, such as interrupt or exception instructions, the best choice may simply be a default bank, since they are by nature unpredictable in their occurrence.

Although a method has been shown whereby the sequential probe hints are assured to be accurate when the data is loaded into the I-cache, operations may occur that would cause the hint value to become stale. For example, the allocation logic may overwrite one block of I-cache data with a new block. If the instruction stream is executed again, the overwritten block will be retrieved from memory, and placed in one of the other I-cache locations. However, if the instruction preceding the retrieved instruction remained in the I-cache, there is a likelihood that the retrieved block will be not be stored in its previous location, and therefore the hint will be incorrect. Therefore, sequential hints, as well as branch hints must routinely be 'trained' in order to ensure the highest degree of accuracy.

The hints are trained in the following manner. When a 'miss' occurs on the first probe, and a 'hit' occurs on the second probe, the hint stored along with the instruction must be 'trained' to the correct probe value. In order to accomplish this, a mechanism must be included that will allow for the probe field in the I-cache to be updated with the appropriate hint data.

A number of mechanisms may be used to update the various hint fields. The sequential hint and the branch hints should be written back to the I-cache location. In order to accomplish the write back without interrupting the read process of the I-cache 16a, the probe field portion of the I-cache could be dual-ported, to allow for both read and write operations to be accomplished simultaneously on different I-cache addresses.

Referring briefly to FIG. 2, probe hint set logic 70 is shown to receive the current probe hint signal on line 41 (as provided from mux 47), the probe select signal (from control logic 39), the next_pc from mux 38, the probe field from decode logic 30, a first-probe signal and a second-probe signal from I-cache control logic 72, and a 'miss' signal from compare logic 73. The first-probe signal is a status signal, issued by cache control logic 72, to indicate that the I-cache is being accessed by the first selected probe address. If the 'miss' signal becomes asserted while the first-probe signal is asserted, then the value of the probe hint on line 41 is known to be incorrect. As a result of the miss, a signal second-probe is asserted from the I-cache control logic 72. If, during the time period that the second-probe signal is asserted, the 'miss' signal does not become asserted, then the second probe value, now provided on probe hint line 41, is known to be the correct probe value. This value is used to replace either the sequential probe hint value, or the branch probe hint value, of the probe field, depending upon the value of the probe-select signal from control logic 39.

If, however, the 'miss' signal is asserted during the period of time that the second_probe signal is asserted, the required data must be obtained from the b-cache and allocated to one of the I-cache banks. When the bank is selected, depending upon the type of instruction which caused the miss, either the branch hint value or the sequential hint value will be updated with the value of the allocated bank. The other hint field, which is not updated, will remain unchanged. Leaving the branch hint field unchanged when updating the sequential hint field eliminates the need to re-train the hint field when the instruction subsequently branches.

Because this new probe hint needs to be stored at the address of the instruction preceding the instruction that generated the 'miss', a silo 170 of the next_pc values and probe hints (from line 41) are stored in probe hint logic 70. When a new probe hint value is determined, the appropriate address is used to access the I-cache 16a, and the updated probe field is stored at that I-cache address. As a result, the next time that the instruction is executed, the probe hint field will be accurate.

Although the above described apparatus and method shows the probe field stored directly with the instruction data in the I-cache, it should be understood that this is not a requirement. So long as an association remains between the stored probe field and the instruction data, the desired accuracy of the probe prediction mechanism will be maintained.

Figure 5:
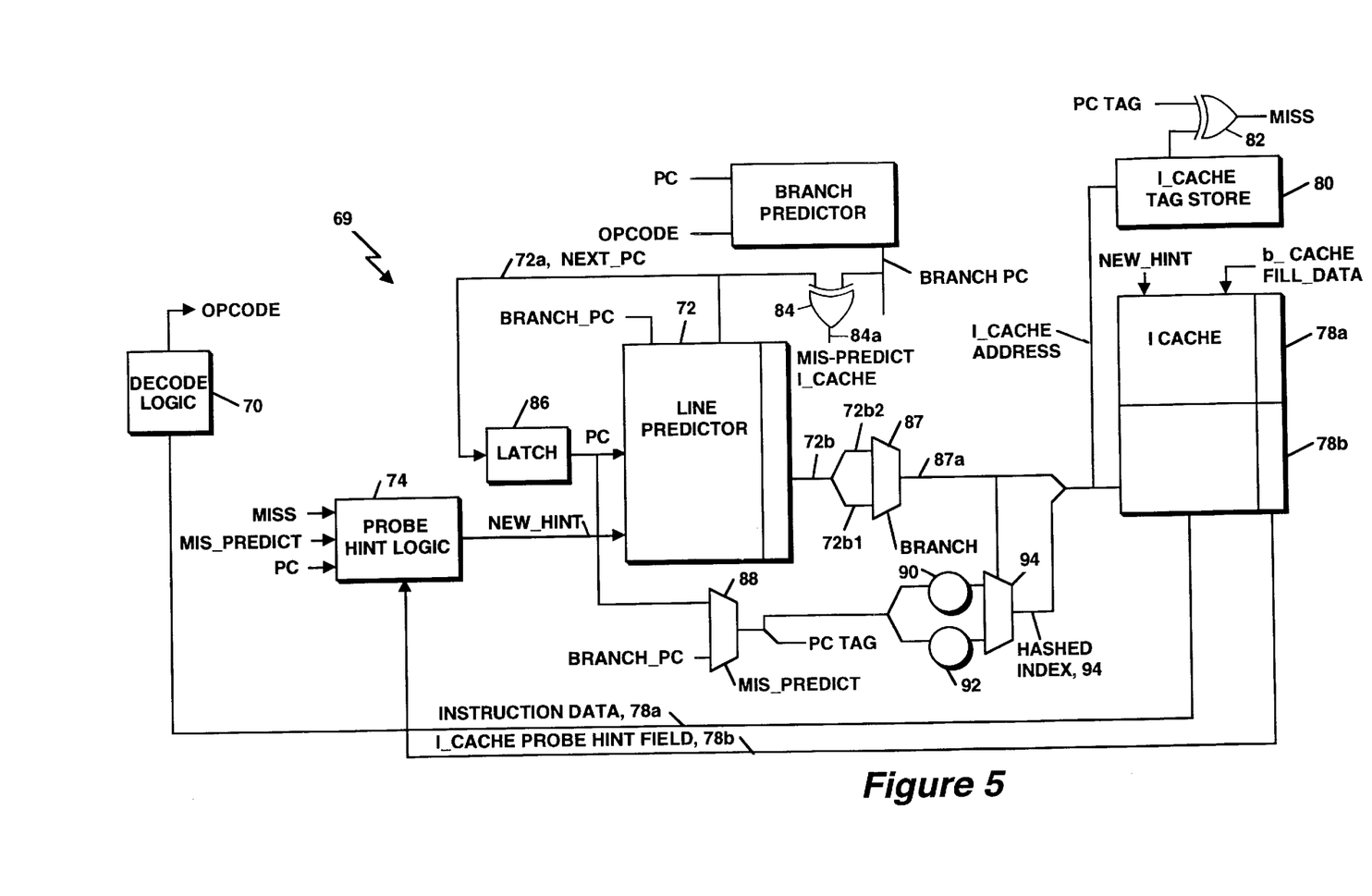
FIG. 5 illustrates a second embodiment of the prediction logic incorporated in the central processing unit of FIG. 1.

Referring now to FIG. 5, another embodiment incorporating the principles of the present invention illustrates a CPU 69 including decode logic 70 coupled to receive instruction data via line 78a from an I-cache 78. The I-cache 78 comprises two banks 78a and 78b, each having an equal number of storage locations. In each I-cache location is stored one instruction, and a probe hint field. The probe hint field is forwarded on line 78b to probe hint logic 74 for purposes that will be described later.

CPU 69 also includes a line predictor 72. Each entry of the line predictor 72 stores a program counter (PC) and a probe hint field. Each time the line predictor is accessed, a new PC is output on line 72a, and a probe hint field is output on line 72b. The probe hint field is further divided into a sequential probe hint field on line 72b2, and a branch hint field on line 72b1.

The PC output of the line predictor is fed as next-PC signal on line 72a to latch 86. The output from latch 86 is used to address the line predictor 72. Accordingly, the line predictor 72 is used to provide a sequential flow of PC's for stepping through instruction data.

The PC output from latch 86 is fed to mux 88. A second input to mux 88 is a branch_PC. The branch_PC is provided by branch predictor logic 76. The branch predictor logic 76 operates, responsive to the current PC and an opcode, to predict whether or not an instruction is going to branch. The prediction may be based on prior branch histories, or other mechanisms well known in the art. When the branch prediction logic 76 determines that a branch will occur, it provides the destination branch_PC on line 76a to mux 88. In addition, the branch_PC is compared against the next_PC output from the line predictor logic 72. When there is a miscompare, then a branch has occurred, and the signal mis-predict on line 84a is asserted.

The mis-predict signal on line 84a is used as a select for mux 87, to select between the sequential probe hint field and the branch probe hint field. In addition, the branch_PC is fed back into the line predictor 72, in order to update the line prediction logic such that during the next pass through the instruction stream, the branch-PC will be readily accessible.

The mis-predict signal on line 84a is also used as a select for mux 88. The selected PC is fed through mux 88, and divided into an I-cache index portion, and a PC tag portion. As described in FIGS. 2A and 2B, the PC tag is fed to compare logic 82 to determine whether or not the accessed data is the required data. The I-cache index is altered via hashing functions f2 and f1, and the selected probe hint field on line 87a is used to select between either of the hashed addresses to provide a hashed index on line 94a. This hashed index is combined with the selected probe hint field on line 87a to provide an I-cache address.

The embodiment shown in FIG. 5 operates similarly to that of FIGS. 2A and 2B. Cache control logic (not shown in this figure) operates to control the probes. If there is a miss on the first probe, but a hit on the second probe, probe hint logic 74 operates to update the appropriate location in the line predictor 72, and in the I-cache 78 in order to 'train' the hints.

The line predictor 72 also receives probe hint data from the I-cache 78. When data from the b-cache is written to the I-cache, the probe field is copied to both the line predictor 72 and the I-cache 78. It may occur, during operation that the hint field stored by the line predictor becomes stale. Such a case would occur when the mis-predict signal indicates that a branch has occurred, and replaces the old address with a branch address in the line predict logic. In such a case, the appropriate probe field for the newly stored branch address must be retrieved from the I-cache 78, and stored at the appropriate location in the line predictor 72.

One fundamental difference between the embodiment of FIG. 5 and that of FIG. 2 involves the association between the probe hints and the related instructions. In the embodiment of FIG. 2, the probe hint gives a prediction as to which address should be used to select the next instruction. In the embodiment of FIG. 5, the probe hint is used to predict which address should be used to select the current instruction.

The embodiment of FIG. 5 thus incorporates the advantages of having a probe hint field associated with each of the instructions without the necessity that it be stored along with the instruction data. By maintaining an association between the stored probe field and the instruction data, the desired accuracy of the probe prediction mechanism is preserved.

The above described I-cache designs, by incorporating accurate I-cache bank prediction, incorporate the performance advantages of direct mapped cache addressing with the low miss rates associated with set-associative cache designs. The accuracy of the bank prediction is enhanced because the inherent nature of the stored data is taken into account when formulating the associated bank prediction value for the data. In addition, a straightforward mechanism for training the bank prediction hints allows for continued accuracy independent of changes to instruction allocation.

Having described a preferred embodiment of the invention, it will now become apparent to one of skill in the art that other embodiments incorporating its concepts may be used. It is felt, therefore, that this invention should not be limited to the disclosed embodiment, but rather should be limited only by the spirit and scope of the appended claims

What we claim is:

1. A computer system comprising:
   a first memory for storing a plurality of instructions, each instruction having one of a plurality of possible instruction types;
   a second memory, relatively smaller and faster than said first memory, for storing a subset of said instructions from said first memory; and
   a third memory having a plurality of locations, each of said locations associated with one of said locations of said second memory, said plurality of locations of said third memory for storing a first plurality of prediction values;
   a second plurality of prediction values, each one of said second plurality of prediction values associated with a respective one of said instruction types; and
   means, responsive to a given instruction stored in one of said locations of said second memory, for selecting one of said second plurality of prediction values associated with an instruction type of said given instruction.

2. The apparatus of claim 1, wherein said subset of instructions is stored in said second memory in sequence, and wherein said means for selecting further comprises:
   means for determining a bank number indicating one of a plurality of banks within said second memory, said bank number indicating in which of said plurality of banks a next instruction in the sequence will be stored; and
   means, responsive to said instruction type of said given instruction, for storing said bank number in said associated location of said third memory.

3. The apparatus of claim 2, where said means for determining a bank number further comprises means for determining which of said plurality of banks has had the least recent access.

4. The apparatus of claim 2, wherein said third memory comprises a plurality of locations, each of said locations storing an address to said second memory and a prediction value associated with said address to said second memory.

5. The apparatus of claim 1, wherein said subset of instructions are stored in said second memory in sequence, and wherein said means for selecting further comprises:
   means, for said given instruction stored in said second memory, for determining a bank number, said bank number indicating in which of said plurality of banks said given instruction will be stored; and
   means, responsive to said instruction type of said given instruction, for storing said bank number in a one of said plurality locations of said third memory associated with a location in said second memory storing said given instruction.

6. The apparatus of claim 1, further comprising:
   means, coupled to said second memory and responsive to said instruction type of said given instruction, for providing a first address for addressing said second memory to retrieve required instruction data, using an associated prediction value stored in said third memory, said associated prediction value stored in a location in said third memory associated with a location in said second memory storing said given instruction.

7. The apparatus of claim 5, further comprising:
   means, responsive to a signal indicating that said first address is incorrect, for determining whether said required data is located in said second memory; and
   means, responsive to a determination that said required data is located in said second memory, for updating said prediction value in said associated location of said third memory to indicate the location of said required data.

8. The apparatus of claim 7, wherein said prediction value comprises a sequential prediction value and a branch prediction value based on said given instruction.

9. The apparatus of claim 8, wherein said means for providing a first address further comprises:
   means, responsive to said instruction type of said given instruction, for selecting either said sequential prediction value or said branch prediction value to form said first address.

10. The apparatus of claim 9, further comprising:
    means for inverting said selected prediction value; and
    means, responsive to said signal indicating that said first address is incorrect, for generating a second address for accessing said second memory using said inverted selected prediction value.

11. The apparatus of claim 10, further comprising:
    means, responsive to said determination that said required data is located in said second memory, for updating said associated field of said third memory with said inverted selected prediction value.

12. The apparatus of claim 8, wherein said means for providing a first address further comprises:
    means, responsive to said first address, for generating a next sequential address;
    means, responsive to said instruction type of said given instruction being a call instruction, for storing said next sequential address on a stack, including means for storing said sequential prediction value as said stack prediction value along with said next sequential address in said stack;
    means, responsive to said instruction type of said given instruction, for selecting either said next sequential address or said address stored on said stack to form said first address; and
    means, responsive to said instruction type of said given instruction, for selecting either said sequential prediction value, said stack prediction value, or said branch prediction value to form said first address.

13. The apparatus of claim 7, wherein a plurality of banks of said third memory is accessed simultaneously.

14. A method of addressing a cache memory, said cache memory comprising a plurality of banks of memory locations for storing a plurality of instructions having a plurality of types, said method comprising the steps of:

determining, responsive to retrieved instruction data, the plurality of potential next addresses of required data in said cache memory;

storing, at a location associated with said retrieved instruction data, a prediction value, said prediction value for indicating which one of said plurality of banks of said cache memory stores said required data, said prediction value determined responsive to a type of said retrieved instruction data;

generating a plurality of further prediction values such that at least one prediction value is associated with each one of said instruction types; and selecting, responsive to said prediction value, one of said potential next addresses for addressing said cache memory.

15. The method according to claim 14, further comprising the steps of:

responsive to a determination that said required data is not located at said selected one of said potential next addresses, determining if said required data is located in said cache memory;

responsive to a determination that said required data is located in said cache memory, determining in which bank said required data is located; and updating said prediction value at said location associated with said retrieved instruction data.

16. The method according to claim 15, wherein said cache memory data comprises a subset of main memory data, and wherein said method further comprising the step of:

sequentially retrieving data from said main memory for storage in said cache memory;

determining a type of said retrieved data;

allocating each item of retrieved memory data to one bank of said cache memory;

storing each item of said retrieved memory data in said allocated bank of said cache memory; and storing, with each item of stored memory data, said prediction value, said prediction value indicative of the allocated bank of the next retrieved data in said sequence of retrieved data.

17. The method of claim 16 wherein said prediction value and said retrieved data are stored in a common memory device.

18. The method of claim 16 wherein said prediction value is stored in a second memory device, said method further comprising the steps of:

storing, in said second memory device with said predicted value, the address of said cache memory location storing said retrieved data.

19. The method of claim 14 wherein said prediction value comprises a sequential prediction value and a branch prediction value, and wherein said method further comprises the steps of:

selecting, responsive to a type of said instruction being a first type of instruction, said sequential prediction value as said prediction value for selecting said one of said probable next addresses; and selecting, responsive to a type of said instruction being a second type of instruction, said branch prediction value as said prediction value for selecting said one of said probably next addresses.

20. The method of claim 19, wherein said first type of instructions are instructions which maintain a sequential flow in a sequence of instructions.

21. The method of claim 19, wherein said second type of instructions are instructions which interrupt a sequential flow in a sequence of instructions.

* * * * *